(No Model.) 2 Sheets—Sheet 1.

W. A. LEE & J. C. FULLER.
CHECK ROW ATTACHMENT FOR CORN PLANTERS.

No. 308,779. Patented Dec. 2, 1884.

(No Model.) 2 Sheets—Sheet 2.
W. A. LEE & J. C. FULLER.
CHECK ROW ATTACHMENT FOR CORN PLANTERS.
No. 308,779. Patented Dec. 2, 1884.
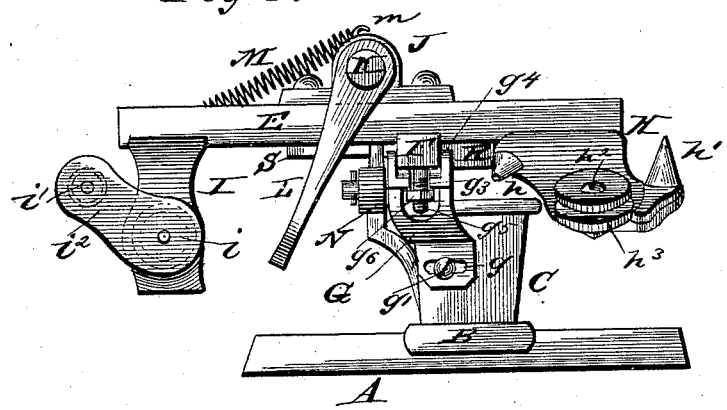
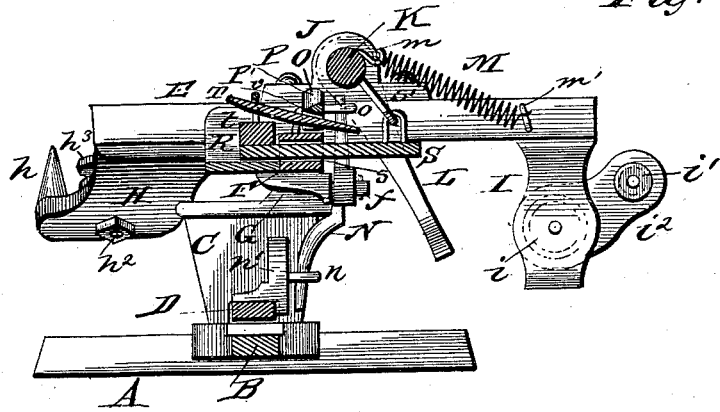
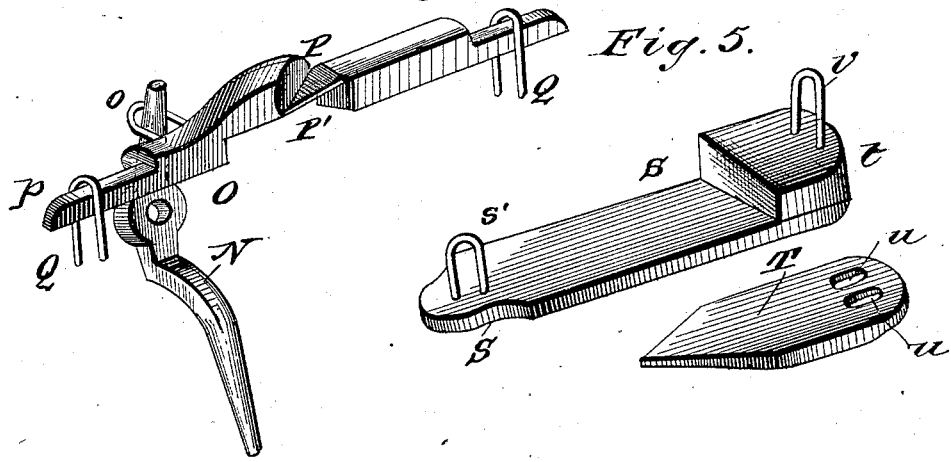
WITNESSES
INVENTORS

UNITED STATES PATENT OFFICE.

WILLIAM A. LEE AND JAMES C. FULLER, OF WINFIELD, KANSAS.

CHECK-ROW ATTACHMENT FOR CORN-PLANTERS.

SPECIFICATION forming part of Letters Patent No. 308,779, dated December 2, 1884.

Application filed August 4, 1884. (No model.)

*To all whom it may concern:*

Be it known that we, WILLIAM A. LEE and JAMES C. FULLER, of Winfield, in the county of Cowley and State of Kansas, have invented certain new and useful Improvements in Check-Row Attachments for Corn-Planters; and we do hereby declare the following to be a full, clear, and exact description of the invention, such as will enable others skilled in the art to which it pertains to make and use the same.

Our invention relates to check-row attachments for corn-planters, the object being to provide a device of this character adapted to be adjustably secured to the seed-boxes of a planter, and so constructed as to insure a regular uniform operation to reciprocate the seed-slide.

This invention consists in the features of construction and combination of parts hereinafter described, and pointed out in the claims.

Figure 1:
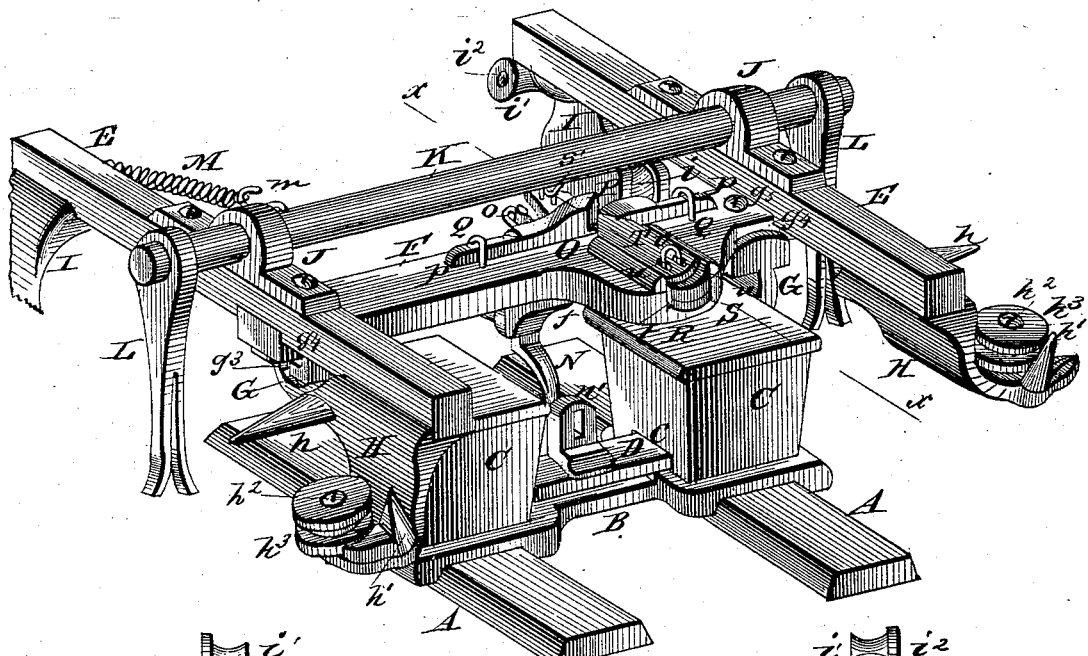
Figure 2:
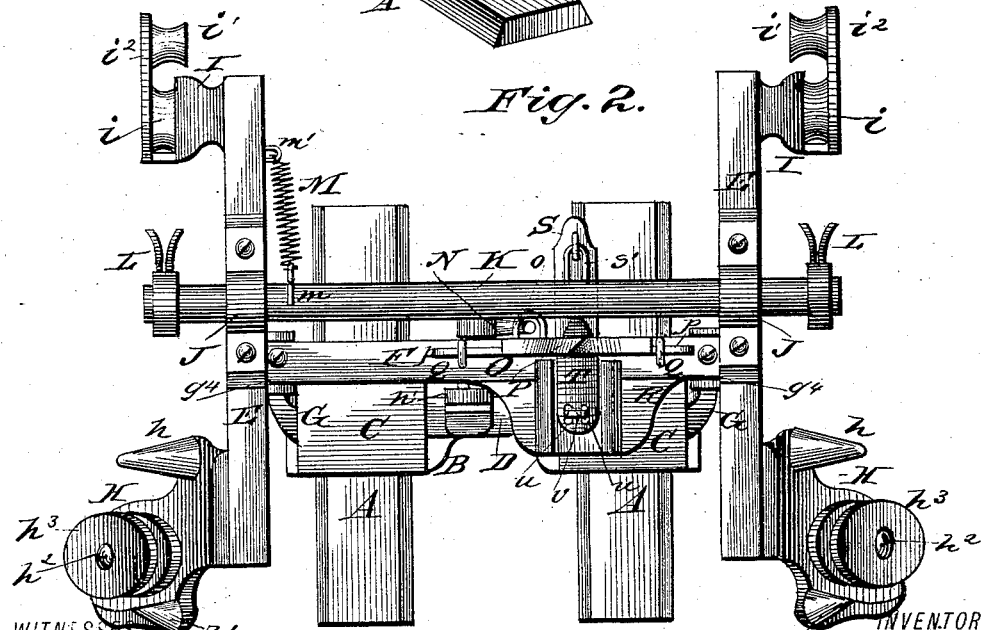

In the drawings, Figure 1 represents our invention in perspective. Fig. 2 is a plan view of part of a planter with our improvements applied thereto. Fig. 3 is a side elevation of the same. Fig. 4 is a vertical section on the line $x\ x$ of Fig. 1, and Fig. 5 illustrates parts in detail.

A A represent parts of the planter-frame, connected by a cross-bar, B.

C C are the seed-boxes, secured upon the ends of the bar B, and slotted at the points $c$ $c$ to receive the ends of the seed-slide D.

E E represent the side bars, and F the cross-bar, of the check-row attachment. Said cross-bar is supported above the seed-boxes by means of brackets G G, secured to the outer sides of said boxes. Each of the brackets G is formed near its lower end with a horizontal slot, $g$, through which a securing-screw, $g'$, passes. The upper ends of these brackets G are each formed with a slot, $g^3$, and recessed to form a seat, $g^4$, to receive the cross-bar F of the check-row attachment. The screws $g^5$, which secure the cross-bar F, are held by nuts $g^6$, which rest within the slots $g^3$ of the brackets G, said slots being sufficiently large to allow of the turning of the nut when the check-row attachment is to be removed.

Upon each of the forward ends of the side bars E is secured a depending inclined bracket or plate, H, formed with a horizontal prong or guard, $h$, and an inclined guard, $h'$. Between these guard-prongs is mounted upon a stud-journal, $h^2$, a grooved anti-friction wheel, $h^3$.

Upon each of the rear ends of the side bars, E E, is secured a depending recessed bracket, I, having an anti-friction wheel, $i$, journaled within the recess, and a similar wheel, $i'$, mounted upon a projecting stud, $i^2$, of the bracket.

Upon the upper sides of the side bars, E E, and cross-bar F are secured brackets J J, each formed with a bearing for the oscillating shaft K, supported therein.

Upon each end of the shaft K is secured a bifurcated arm, L, through which the check-wire passes. These arms L are held in contact with the prongs $h$ in convenient position to be engaged by the knots of the check-wires by the action of the spring M, secured at one end to a loop, $m$, on the shaft K, and at the opposite end to an eye, $m'$, projecting from the inner side of the adjacent side bar, E.

The cross-bar F of the attachment is provided with a downwardly and rearwardly projecting stud-journal, $f$, upon which is pivoted a vibrating lever, N. The lower end of this lever enters a loop, $n$, projecting from a central stud, $n'$, of the seed-slide D. The upper end of the lever N enters a loop, $o$, projecting rearwardly from a reciprocating slide, O. This slide is recessed on opposite sides to form cam-surfaces P and P', and its ends $p$ are reduced to enter guide-loops Q, projecting from the upper side of the cross-bar F. Said cross-bar is formed with a forwardly-projecting guideway, R, arranged at one side of the center of the bar. Within this guideway is arranged a plunger, S, whose rear end projects through a slot, $s$, formed in the cross-bar, and is connected to a loop, $s'$, depending from the shaft K. The forward end of the plunger S is provided with a block, $t$, upon which is loosely supported a guide-plate, T. The latter is formed with perforations $u$, through which pass the ends of a staple, $v$, which secures the plate T upon the block $t$.

The operation of the mechanism thus described is as follows: The check-wire passes around the rollers and through the slots of the arms L, which latter are drawn back by the contact therewith of the stops on the check-wire. This rearward movement of the arms L turns the shaft K forward. After the arms L are released by the cord-stop the spring M retracts said arms.

It will be apparent that when the shaft K is turned as above described the plunger S will be reciprocated, it being connected to said shaft by the loop $s'$. This movement of the plunger brings the guide-plate T into alternate contact with the cam-surfaces P and P' of the slide O to reciprocate the latter, whose movement vibrates the lever N and operates the seed-slide. The construction thus described insures a regular and uniform dropping of the corn.

Having fully described our invention, what we claim as new, and desire to secure by Letters Patent, is—

1. In a check-row attachment for corn-planters, the combination, with the seed-slide and a vibrating lever, of an oscillating shaft, a reciprocating plunger loosely secured to said shaft, and a slide formed with opposite cam-surfaces and adapted to be operated by the plunger, substantially as set forth.

2. In a check-row attachment for corn-planters, the combination, with an oscillating shaft and a seed-slide, of a vibrating lever, a double cam-faced slide connected to said lever, a plunger connected to the shaft, and a loosely-secured guide-plate, substantially as set forth.

3. In a check-row attachment, the combination, with the seed-slide and the oscillating shaft, of a cross-bar formed with a guideway, a plunger and guide-plate arranged therein, a reciprocating cam-faced slide, and a vibrating lever connected to said slide, substantially as set forth.

4. The combination, in a check-row attachment, with the seed-slide and its vibrating lever, of the slide formed with opposite cam-surfaces, and supported upon the cross-bar of the attachment, and a guide-plate adapted to come in contact alternately with the cam-surfaces of the slide, substantially as set forth.

In testimony whereof we have signed this specification in the presence of two subscribing witnesses.

WILLIAM A. LEE.
JAMES C. FULLER.

Witnesses:
H. L. TOMLIN,
JNO. D. PRYOR.